United States Patent
Oka et al.

(10) Patent No.: US 8,893,472 B2
(45) Date of Patent: Nov. 25, 2014

(54) COGENERATION APPARATUS

(75) Inventors: Koichi Oka, Wako (JP); Daiki Kamiyama, Wako (JP); Kosuke Yamana, Wako (JP); Nobuyuki Sasaki, Wako (JP); Hideyuki Ushiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 13/413,120

(22) Filed: Mar. 6, 2012

(65) Prior Publication Data

US 2012/0227384 A1    Sep. 13, 2012

(30) Foreign Application Priority Data

Mar. 8, 2011  (JP) .................. 2011-050681

(51) Int. Cl.
| | |
|---|---|
| F01N 3/00 | (2006.01) |
| F01N 3/02 | (2006.01) |
| F01N 3/10 | (2006.01) |
| F01N 3/20 | (2006.01) |
| F02G 5/04 | (2006.01) |
| F02B 63/04 | (2006.01) |

(52) U.S. Cl.
CPC ............... *F02G 5/04* (2013.01); *F02B 63/044* (2013.01); *F02G 2260/00* (2013.01); *F02G 2262/00* (2013.01); *Y02E 20/14* (2013.01); *Y02T 10/166* (2013.01)
USPC .................. 60/285; 60/274; 60/286; 60/287; 60/288; 60/295

(58) Field of Classification Search
USPC ...................... 60/274, 285, 287, 288
See application file for complete search history.

(56) References Cited

U.S. PATENT DOCUMENTS

| | | | | |
|---|---|---|---|---|
| 5,323,061 | A  * | 6/1994 | Immler et al. ................. 290/2 |
| 6,595,431 | B1 * | 7/2003 | Lieske .................. 237/12.1 |
| 8,004,099 | B2 * | 8/2011 | Yuri ........................ 290/40 R |
| 2009/0127868 | A1 * | 5/2009 | Yuri et al. ................ 290/40 R |
| 2011/0036095 | A1 * | 2/2011 | Krajicek ........................ 60/775 |

FOREIGN PATENT DOCUMENTS

| | | |
|---|---|---|
| JP | 2007-187027 | 7/2007 |
| JP | 2008-185001 | 8/2008 |
| JP | 2009-047053 | 3/2009 |

OTHER PUBLICATIONS

Japanese Office Action for Application No. P2011-050681 dated Jul. 1, 2014; partial English Translation included.

* cited by examiner

*Primary Examiner* — Audrey K Bradley
*Assistant Examiner* — Dapinder Singh
(74) *Attorney, Agent, or Firm* — Rankin, Hill & Clark LLP

(57) ABSTRACT

A cogeneration apparatus includes: an airtight chamber provided within an apparatus casing and constructed to prevent exhaust gas of a prime mover from flowing out therefrom; and a relief valve provided in a water flow path within the airtight chamber and constructed to discharge the exhaust gas, contained in the water flow path, to the airtight chamber.

5 Claims, 14 Drawing Sheets

COGENERATION APPARATUS

FIELD OF THE INVENTION

The present invention relates to cogeneration apparatus constructed in such a manner that water introduced into an apparatus casing is changed into hot water by use of exhaust or waste heat of a prime mover and the thus-generated hot water is directed out of the casing to be used for a desired purpose.

BACKGROUND OF THE INVENTION

The conventionally-known cogeneration apparatus are combined heat and power apparatus which include an engine, power generator and heat exchanger provided within an apparatus casing, and in which exhaust heat of an engine driving the power generator is collected and the collected heat is used for heating the interior of a room and the like. An example of such cogeneration apparatus is disclosed in Japanese Patent Application Laid-Open Publication No. 2007-187027, which, because the engine, power generator and heat exchanger are provided within the apparatus casing, is constructed to ventilate the air within the casing to thereby keep optimal an environment temperature within the casing.

Among other examples of the conventionally-known cogeneration apparatus is one which includes a CO sensor for detecting carbon monoxide (CO) contained in exhaust gas. When exhaust gas has flown out to within the casing, carbon monoxide (CO) contained in the exhaust gas is detected by the CO sensor, so that the engine is deactivated in response to CO detection information output from the CO sensor. However, in order for the CO sensor to detect carbon monoxide (CO) contained in the exhaust gas, it is necessary that a certain amount of exhaust gas be stored within the casing. Therefore, the exhaust gas stored within the casing may flow out of the casing before the CO sensor detects carbon monoxide in the exhaust gas flown out to within the casing. If the cogeneration apparatus is installed indoors, the exhaust gas may undesirably flow out of the casing to an indoor area.

SUMMARY OF THE INVENTION

In view of the foregoing prior art problems, it is an object of the present invention to provide an improved cogeneration apparatus which can reliably prevent exhaust gas from flowing out of the interior of the casing to an indoor area.

In order to accomplish the above-mentioned object, the present invention provides an improved cogeneration apparatus cogeneration apparatus for generating hot water from water, introduced from outside an apparatus casing into the apparatus casing via a water flow path, by use of exhaust or waste heat of a prime mover, and directing the generated hot water out of the apparatus casing via the water flow path, which comprises: an airtight chamber provided within the apparatus casing and constructed to prevent the exhaust gas of the prime mover from flowing out from the airtight chamber; and a relief valve provided in the water flow path within the airtight chamber and constructed to discharge the exhaust gas, contained in the water flow path, to the airtight chamber.

Because the exhaust gas, contained in the water flow path, can be discharged to the airtight chamber via the relief valve and the airtight chamber is capable of preventing the exhaust gas of the prime mover from flowing out therefrom, the exhaust gas discharged to the airtight chamber can be caused to stay in the airtight chamber. Thus, in a case where the cogeneration apparatus of the present invention is installed indoors (in an indoor area, such as the interior of a room), the exhaust gas discharged to the airtight chamber can be prevented from undesirably flowing out from within the casing to the indoor area.

In addition, the cogeneration apparatus of the present invention is constructed to discharge the exhaust gas, contained in the water flow path, to the airtight chamber via the relief valve. Thus, the cogeneration apparatus of the present invention can prevent the exhaust gas, contained in the water flow path, from undesirably flowing out to the indoor area (e.g., the interior of the room) where waste heat (exhaust heat) of the prime mover is used for a heating purpose.

Preferably, in the cogeneration apparatus of the present invention, the relief valve is constructed to be opened once inner pressure of the water flow path exceeds a threshold value. Namely, if exhaust gas is contained in the water flow path, the inner pressure of the water flow path would exceed the threshold value, in response to which the relief valve is opened so that not only the hot water is discharged from the water flow path to the airtight chamber but also the exhaust gas contained in the hot water is discharged to the airtight chamber. Due to the hot water being discharged from the water flow path to the airtight chamber, an amount of hot water in the water flow path decreases so that the hot water flowing in the water flow path increases in temperature.

Thus, the cogeneration apparatus of the present invention further comprises a temperature sensor provided in the water flow path for detecting a temperature of the hot water flowing in the water flow path; and a control section for, on the basis of information indicative of the temperature detected via the temperature sensor, identifying a temperature increase of the hot water occurring as a result of opening of the relief valve, to thereby deactivate the prime mover in response to the identified temperature increase. In this way, the control section can identify the opened state of the relief valve on the basis of a temperature increase of the hot water and output to an actuator a signal for deactivating the prime mover. Thus, once the hot water increases in temperature due to the opening of the relief valve, the prime mover can be deactivated promptly by means of the actuator. In this way, the exhaust gas contained in the water flow path can be prevented from undesirably flowing out to the indoor area (interior of the room) where the waste heat (exhaust heat) of the prime mover is used for heating. In addition, because the airtight chamber is capable of preventing the exhaust gas from undesirably flowing out therefrom, the exhaust gas discharged to the airtight chamber can stay in the airtight chamber, so that it can be prevented from being undesirably discharged from within the airtight chamber to the indoor area.

Preferably, in the cogeneration apparatus of the present invention, the airtight chamber is capable of communicating with a combustion chamber of the prime mover via an intake passage. The cogeneration apparatus of the present invention further comprises an exhaust gas separation section provided in the water flow path within the airtight chamber for separating the exhaust gas, contained in the water flow path, from the hot water, the exhaust gas separated from the hot water by the exhaust gas separation section being discharged via the relief valve to the airtight chamber.

Thus, if exhaust gas is contained in the water flow path, only the exhaust gas can be discharged to the airtight chamber while being separated from the hot water by means of the exhaust gas separation section. Further, because the airtight chamber communicates with the combustion chamber of the prime mover via the intake passage, the exhaust gas discharged to the airtight chamber can be compulsorily directed to the combustion chamber via the intake passage. By the compulsory directing of the exhaust gas, the primer mover can be deactivated promptly. In this way, the cogeneration apparatus of the present invention can prevent the exhaust gas, contained in the water flow path, from undesirably flowing out to the indoor area (interior of the room) where the waste heat (exhaust heat) of the prime mover is used heating.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

In the following description, the terms "left" and "right" are used to refer to directions as viewed from the back of a cogeneration apparatus 10 of the present invention.

First Embodiment

Figure 1:
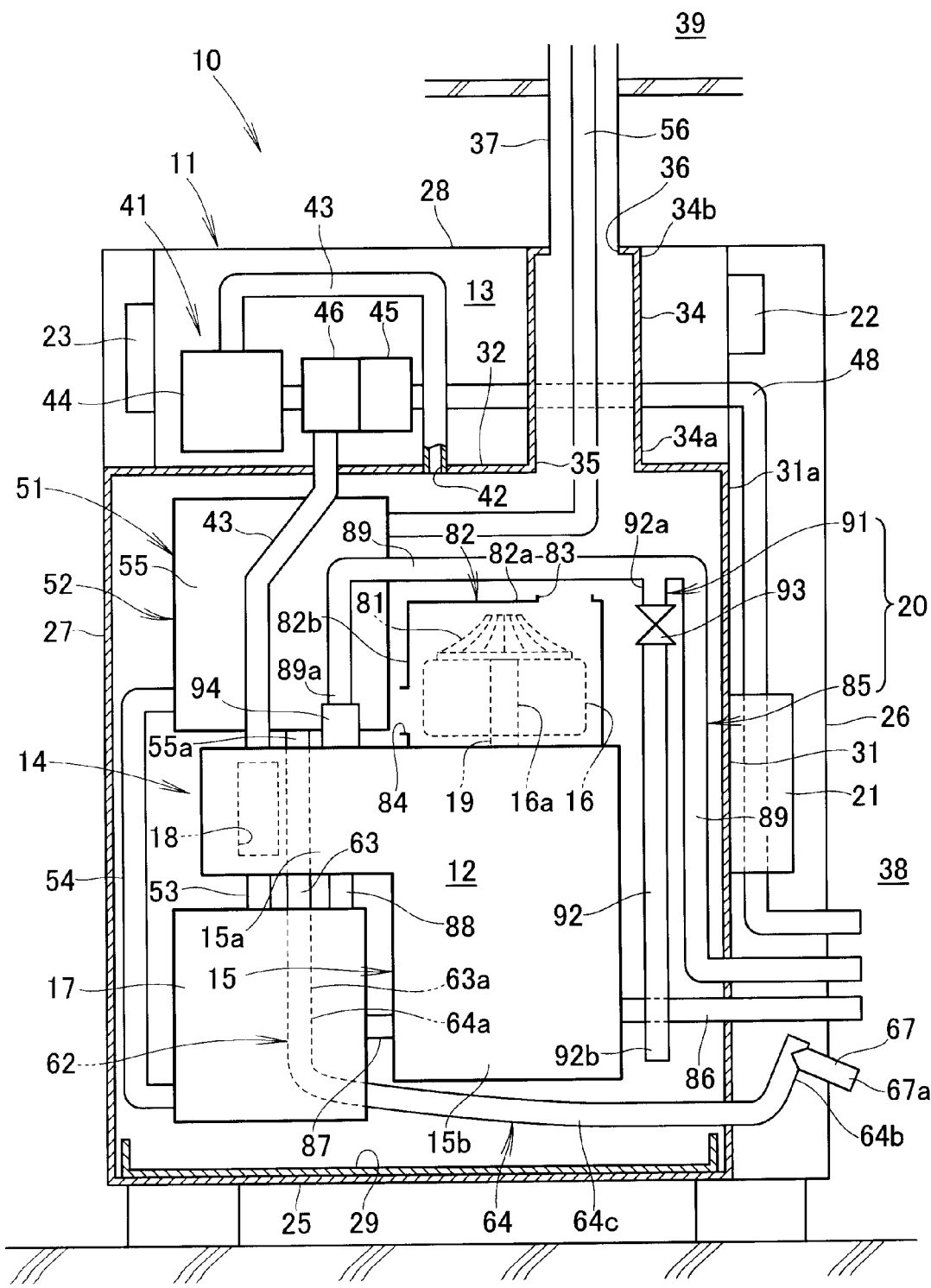
FIG. 1 is a schematic sectional front view showing a cogeneration apparatus according to a first embodiment of the present invention.

Reference is initially made to FIG. 1 which is a schematic sectional front view showing the cogeneration apparatus 10 according to a first embodiment of the present invention. The cogeneration apparatus 10 is a combined heat and power apparatus which includes: a cogeneration casing (apparatus casing) 11 defining an outer frame of the cogeneration apparatus 10; an airtight chamber 12 provided within the cogeneration casing 11; an engine (prime mover) 14 accommodated in the airtight chamber 12; a power generator 16 provided above the body of the engine 14 (hereinafter referred to as "engine body 15"); a heat exchanger 17 provided laterally to the engine body 15; and a hot water output section for outputting hot water generated by the heat exchanger 17.

The cogeneration apparatus 10 further includes: a first control section 21 provided to the left of the engine body 15 outside the airtight chamber 12; a power conversion section 22 provided above the first control section 21 outside the airtight chamber 12; and a second control section 23 provided above the heat exchanger 17 outside the airtight chamber 12.

For example, the cogeneration apparatus 10 is installed in indoors (in an indoor area or room) 38 and constructed to generate hot water by use of exhaust heat (waste heat) of the engine 14) so that the heat of the generated hot water can be used for heating the interior of the room.

The cogeneration casing 11 is formed in a generally rectangular parallelepiped shape by a bottom panel 25, front and rear panels (not shown), a left side panel 26, a right side panel 27 and a roof panel 28. A partition wall 31 is provided within the cogeneration casing 11 adjacent to and along the left side panel 26, and an upper partition section 32 extends from an upper end portion 31a of the partition wall 31 to the right side panel 27.

The airtight chamber 12 is a hermetically sealed space defined by the bottom panel 25, partition wall 31, upper partition section 32, right side panel 27 and ventilation duct 34. The ventilation duct 34 has a lower end portion 34a located at the partition section 42, and an upper end portion 34b located at the roof panel 28. The ventilation duct 34 communicates at the lower end portion 34a with a ventilation opening 35 formed in the upper partition section 32, so that the ventilation duct 34 is in communication with the airtight chamber 12 via the ventilation opening 35. Further, the ventilation duct 34 communicates at the upper end portion 34b with an external duct 37 via a ventilation opening 36 formed in the roof panel 28, and the external duct 37 is in communication with outdoors (outside of the casing) 39.

The airtight chamber 12 is a space provided within the cogeneration casing 11 and accommodates therein the engine body 15, power generator 16 and heat exchanger 17. The airtight chamber 12 has seal performance capable of preventing exhaust gas, discharged via a later-described release passage 92, from flowing out from the airtight chamber 12. An under frame 29 is provided on the bottom panel (bottom portion) 25 of the airtight chamber 12.

The first control section 21, power conversion section (inverter unit) 22 and second control section 23 are accommodated (disposed) in a space 31 within the cogeneration casing 11 but outside the airtight chamber 12. Further, an air cleaner section 44, gas flow rate adjustment section 45 and mixer 46 (including a throttle valve), constituting a part of an intake system 41 of the engine 14, are accommodated (disposed) in the space 31 within the cogeneration casing 11 but outside the airtight chamber 12.

The engine 14 is a gas engine which includes: the engine body 15 capable of rotating a drive shaft 16a of the power generator 16; the intake system 41 that supplies a gas fuel to a combustion chamber 18 of the engine body 15; and an exhaust system 51 that discharges exhaust gas of the combustion chamber 18 to the outdoors 39.

The engine body 15 has a crankshaft 19 connected coaxially with the drive shaft 16a of the power generator 16, and a piston connected to the crankshaft 19 via a con rod. The engine body 15 is a reciprocating type engine in which the piston is slidably provided within a cylinder block 15a and the combustion chamber 18 is provided in a distal end portion of the cylinder block 15a. In the engine body 15, the gas fuel is burned in the combustion chamber 18 so that the piston slides in the cylinder to rotate the crankshaft 19. The rotation of the crankshaft 19 causes the drive shaft 16a of the power generator 16 to rotate.

The intake system 41 has an intake opening 42 formed in the upper partition portion 32, an intake passage 43 communicating the intake opening 42 with the combustion chamber 18 of the engine body 18, and the air cleaner section 44 provided halfway in the intake passage 43. Further, the mixer 46 is provided in the intake passage 43 at a position downstream of the air cleaner section 44. Thus, the combustion chamber 18 of the engine 15 is in communication with the airtight chamber 12 via the intake passage 43, mixer 46, air cleaner section 44 and intake opening 42.

Air sucked in from the airtight chamber 12 is directed through the intake opening 42 to the intake passage 43 and then to the air cleaner section 44, so that the air is cleaned or purified by the air cleaner section 44. The thus-purified air is mixed with a gas fuel by the mixer 46.

The gas fuel is directed to the gas flow rate adjustment section 45 via a gas supply passage 48, so that the gas fuel having been adjusted in flow rate by the gas flow rate adjustment section 45 is directed to the mixer 46. The gas fuel mixed with the air by the mixer 46 is then introduced into the combustion chamber 18 of the engine body 15, via the throttle valve and intake passage 43, so that the engine 14 is driven by the gas fuel.

The exhaust system 51 includes an exhaust section 52 for directing exhaust gas of the combustion chamber 18 to the outside, and a condensed water separation section 62 communicating with a halfway position of the exhaust section 52.

The exhaust section 52 includes: a first exhaust passage 53 communicating the combustion chamber 18 of the engine body 15 with the heat exchanger 17; a second exhaust passage 54 communicating the heat exchanger 17 with a muffler 55 that in turn communicates with an outlet portion of the second exhaust passage 54; and a third exhaust passage 56 communicating the muffler 55 with the outdoors 39.

Exhaust gas of the engine 14 (combustion chamber 18) is directed to the heat exchanger 17 via the first exhaust passage 53, and the exhaust gas is then directed from the heat exchanger 17 to the second exhaust passage 54. Then, the exhaust gas directed to the second exhaust passage 54 is directed to the muffler 55, from which it is directed to the third exhaust passage 56 to be discharged to the outdoors 39.

The condensed water separation section 62 includes: a condensed water passage 63 communicating with a bottom communicating opening 55a of the muffler 55; a storage section 64 communicating with an outlet portion 63a of the condensed water passage 63; and a condensed water discharge section 67 communicating with an outlet portion 64b of the storage section 64.

The condensed water passage 63 is accommodated in the airtight chamber 12, has an inlet portion communicating with the bottom communicating opening 55a of the muffler 55 and extends vertically toward the bottom panel 25. The condensed water passage 63 is a flow passage into which condensed water, contained in the exhaust section 52, is introduced via the communicating opening 55a of the muffler 55.

The storage section 64 is accommodated in the airtight chamber 12 and has an inlet portion 64a communicating with the outlet portion 63a of the condensed water passage 63. The storage section 64 is formed in a substantially U shape with the inlet portion 64a and outlet portion 64b located above the bottom portion 64c.

Condensed water contained exhaust gas can be stored in the storage section 64 formed in such a substantially U shape, and thus, exhaust gas of the condensed water passage 63 can be prevented from being discharged to the airtight chamber 12 via the storage section 64.

The condensed water discharge section 67 is in communication with the outlet portion 64b of the storage section 64. The condensed water discharge section 67 extends obliquely downwardly from the outlet portion 64b of the storage section 64 through the left panel 26 to project into the indoors 38.

Condensed water separated from exhaust gas in the muffler 55 is directed to the condensed water passage 63 of the condensed water separation section 62 and stored into the storage section 64. By being stored into the storage section 64 like this, the condensed water can prevent the exhaust gas, directed from the interior of the muffler 55 to the condensed water passage 63, from being directed to the storage section 64. Thus, the exhaust gas directed to the condensed water passage 63 can be prevented from being discharged from the interior of the cogeneration casing 11 to the indoors 63 by way of the storage section 64.

The power generator 16 is provided above the engine body 15, and the drive shaft 16a of the power generator 16 is connected coaxially with the crankshaft 19 of the engine 14. By being driven by the engine 14, the engine 14 can generate AC electric power or electricity.

A ventilation fan 81 is provided over the power generator 16 and driven in response to driving of the power generator 16. The power generator 16 and the ventilation fan 81 are covered with a fan cover 82. A ventilating air introducing opening 83 is formed in a top wall portion 82a of the fan cover 82, and an air lead-out opening 84 is formed in a side wall portion of the fan cover 82.

The air lead-out opening 84 is in communication with the airtight chamber 12. Thus, while the ventilation fan 81 is in operation, air within the fan cover 82 can be lead out to the airtight chamber 12 through the air lead-out opening 84.

Further, the ventilating air introducing opening 83 is located near the ventilation opening 35 and in communication with the outdoors 39 via the airtight chamber 12, ventilation opening 35, ventilation duct 34 and external duct 37. Thus, while the ventilation fan 81 is in operation, external air, i.e. air in the outdoors 39, can be introduced through the ventilating air introducing opening 83 to inside the fan cover 82 via the external duct 37, ventilation duct 34, ventilation opening 35 and airtight chamber 12.

Namely, by operation of the ventilation fan 81, external air, i.e. air in the outdoors 39, can be introduced to inside the fan cover 82 via the ventilation duct 34, airtight chamber 12, etc. The power generator 16 is cooled with the external air introduced to inside the fan cover 82. The air having cooled the power generator 16 is directed through the air lead-out opening 84 into the airtight chamber 12 and circulates through the airtight chamber 12 so that the engine body 15 and heat exchanger 17 are cooled with the air.

The intake opening 42 is in communication with the airtight chamber 12, and thus, the air, having cooled the engine body 15 and heat exchanger 17, is directed into the combustion chamber 18 of the engine body 15 by way of the intake opening 42, intake passage 43, etc.

To the heat exchanger 17 is directed exhaust gas from the engine 14 via the first exhaust passage 53, as well as water sent from an indoor area outside the cogeneration casing 11 (more specifically, a room where heat of hot water is used for a heating purpose) via a hot water lead-out section 20. The water directed to the heat exchanger 17 is raised in temperature by being heat-exchanged with the exhaust gas, thereby generating hot water.

Figure 2:
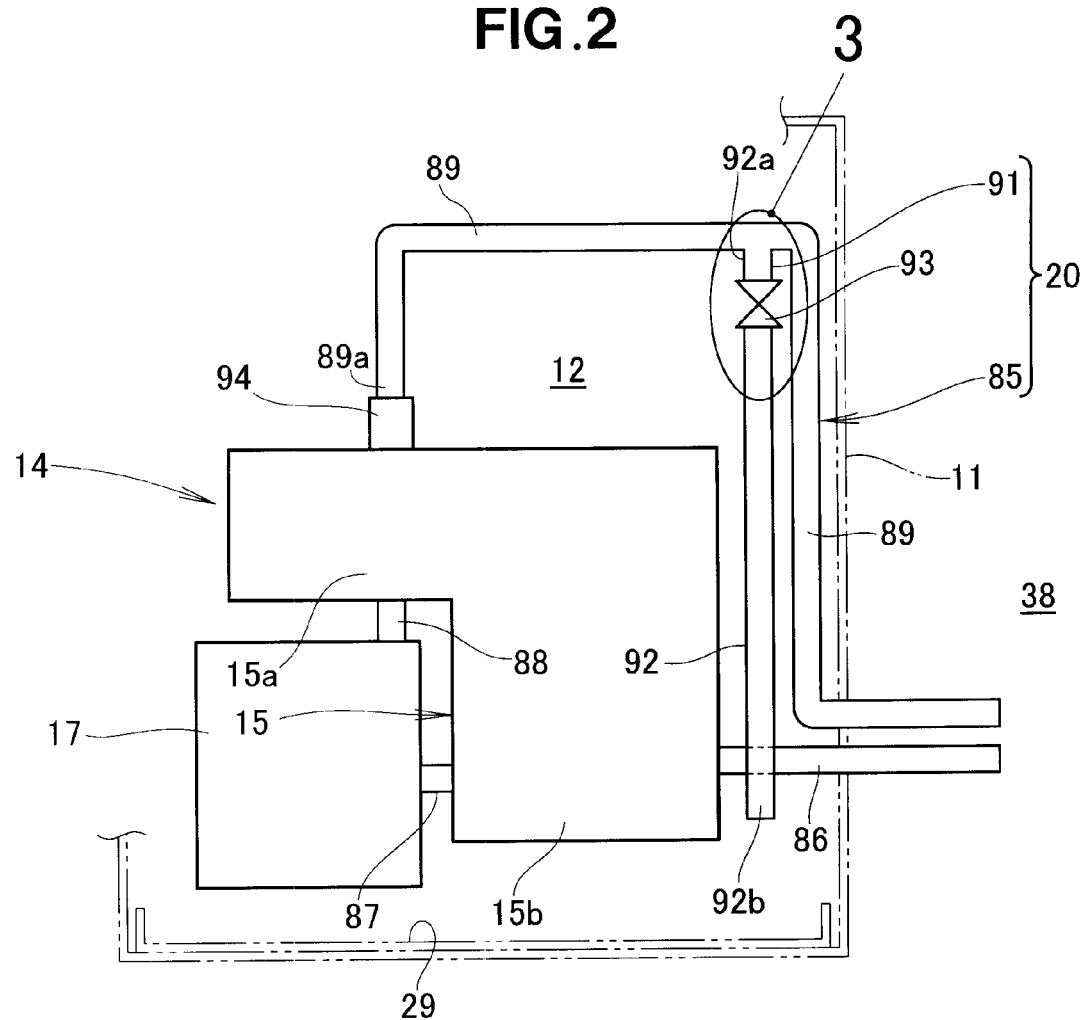
FIG. 2 is a front view of a hot water output section of FIG. 1.

As shown in FIG. 2, the hot water lead-out section 20 includes a water flow path 85 communicating with the heat exchanger 17 and the cylinder block 15a of the cylinder body 15, and an exhaust gas removal section 91 provided in the water flow path 85 and capable of separating exhaust gas of the water flow path 85.

The water flow path 85 includes: a first water passage 86 communicating with an oil tank 15b of the engine body 15; a second water passage 87 communicating the oil tank 15b and the heat exchanger 17 with each other; a third water passage 88 for directing hot water, generated by the heat exchanger 17, to the cylinder block 15a; and a fourth water passage 89 for directing the hot water from the cylinder block 15a to the room where the heat of the hot water is used for heating.

The water flow path 85 includes a pump (not shown) provided in or adjacent to the indoor area (room) where the heat of the hot water is used for heating. The pump can circulate the water (warm or low-temperature hot water) through the water flow path 85.

Through operation of the pump of the water flow path 85, the water is directed from the indoor area, where the heat of hot water is used for heating, is directed to the oil tank 15b, so that the thus-directed water is heat-exchanged with heat of lubricating oil.

Then, the water warmed with the heat of the lubricating oil is directed to the heat exchanger 17 via the second water passage 87, where it is heat-exchanged with waste heat (exhaust heat) of the engine 14. Namely, in the heat exchanger 17, hot water is generated using the waste heat (exhaust heat) of the engine 14 as a heat source.

The thus-generated hot water is directed to the cylinder block 15a of the engine body 15 via the third water passage 88 and then directed out of the cogeneration casing 11 to the indoor area via the fourth water passage 89, so that the heat of the hot water is used for heating the interior of the room.

The exhaust gas removal section 91 includes the release passage 92 communicating with the fourth water passage 89, a relief valve 93 provided halfway in the release passage 92, and a temperature sensor 94 provided in an upstream end portion 89a of the fourth water passage 89.

The release passage 92 is accommodated in the airtight chamber 12, and the release passage 92 extends downwardly with its upper end portion (upstream end portion) 92a communicating with the fourth water passage 89 and with its lower end portion (downstream end portion) 92b located over the under frame 29. Thus, hot water flowing from the lower end portion 92b of the release passage 92 to the air tight chamber 12 can be stored on the under frame 29.

The relief valve 93 is accommodated in the airtight chamber 12 and disposed near the upper end portion 92a of the release passage 92 so that it is in communication with the fourth water passage 89.

Figure 3:
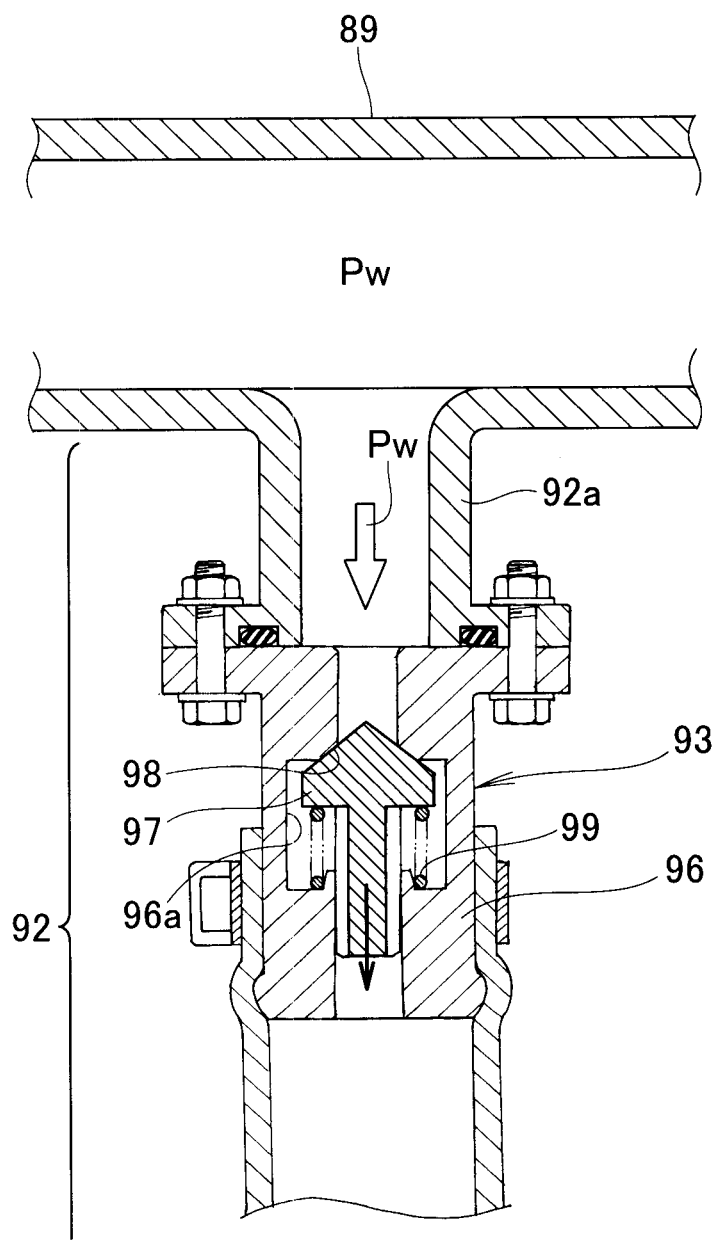
FIG. 3 is a sectional view showing in enlarged scale a section encircled at 3 in FIG. 2.

As shown in FIG. 3, the relief valve 93 includes a body (valve box) 96 capable of communicating with the release passage 92, a valve member 97 slidably provided in a passage 96a of the body 96, and a compression spring 99 for normally biasing the valve member 97 against a body seat portion 98.

The relief valve 93 is constructed in such a manner that the valve member 97 is kept abutted against the body seat portion 98 while inner pressure Pw of the fourth water passage 89 is of a threshold value Pw1 or below. With the valve member 97 kept abutted against the body seat portion 98, the passage 96a of the body 96 is closed, so that the relief valve 93 is maintained in a closed state.

On the other hand, once the inner pressure Pw of the fourth water passage 89 exceeds the threshold value Pw1, the compression spring 99 is compressed so that the valve member 97 moves away from the body seat portion 98 as indicated by a black downward arrow, in response to which the passage 96a of the body 96 is brought into communication with the release passage 92 and thus the relief valve 93 is brought to an opened state.

The temperature sensor 94, provided in the upstream end portion 89a of the fourth water passage 89 as shown in FIG. 2, detects a temperature Tw of hot water flowing through the upstream end portion 89a and conveys or outputs temperature information, indicative of the detected temperature Tw, to the second control section 23.

The upstream end portion 89a of the fourth water passage 89 is in communication with the outlet portion of the cylinder block 15a of the engine body 15, and thus, the hot water flowing through the upstream end portion 89a of the fourth water passage 89 has the highest temperature in the water flow path 85.

As shown in FIG. 1, the first control section 21 is provided on the partition wall 31 in a space 13 inside the cogenerating casing 11 but outside the airtight chamber 12. Whereas an electric leakage breaker is shows as an example of the first control section 21, the first control section 21 is not so limited and may have any other suitable engine control function.

Further, the second control section 23 is also provided in the space 13 inside the cogenerating casing 11 but outside the airtight chamber 12, and it is located above the heat exchanger 17 and to the right of the air cleaner section 44.

The second control section 23 is an ECU which has, among others, a function of switching the power generator 16 to a starter function at the time of activation of the engine 14 and switching the power generator 16 to a power generator function after activation of the engine 14.

Further, the second control section 23 determines, on the basis of the temperature information output from the temperature sensor 94, whether the temperature indicated by the temperature information has exceeded the threshold value Tw1. If the second control section 23 has determined or identified that the temperature indicated by the temperature information has exceeded the threshold value Tw1, it outputs to an actuator (not shown) a deactivation signal for deactivating the engine 14, in response to which the not-shown actuator stops supply of a gas fuel to the engine 14.

The following describe how (or a condition in which) the detected temperature Tw exceeds the threshold value Tw1. Namely, as the relief valve 93 is opened to cause the hot water of the fourth water passage 89 to flow out via the relief passage 92, an amount of hot water flowing in the heat exchanger 17 and cylinder block 15a decreases. Thus, the hot water flowing in the heat exchanger 17 and cylinder block 15a increases in temperature, so that the detected temperature Tw exceeds the threshold value Tw1.

By the temperature sensor 94 detecting the temperature Tw of the hot water flowing through the upstream end portion 89a, it is possible to promptly detect when the temperature Tw of the hot water has exceeded the threshold value Tw1. Namely, as the hot water flows out via the relief passage 92 in response to the opening of the relief valve 93, the engine 14 can be promptly deactivated in response to the temperature Tw of the hot water exceeding the threshold value Tw1.

In addition, the power conversion section 22 is provided on an upper half portion of the partition wall 31 in the space 13 inside the cogeneration casing 11 but outside the airtight chamber 12, as shown in FIG. 1. The power conversion section 22 is an inverter unit that converts AC power, generated by the power generator 16, into a form of power corresponding to required specifications.

Figure 4:
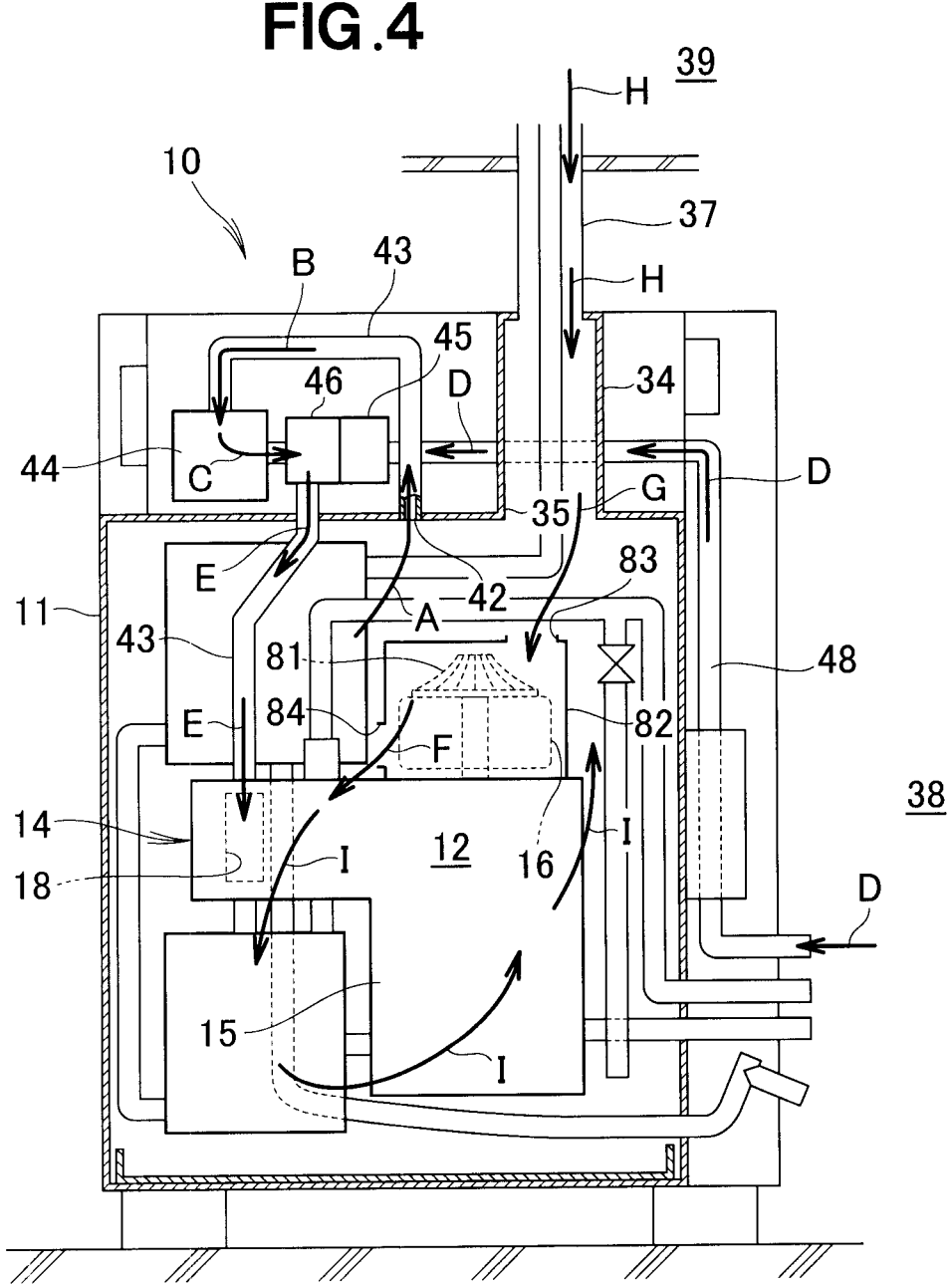
FIG. 4 is a sectional view illustrating an example state in which the cogeneration apparatus is operating normally.

The following describe, with reference to FIG. 4, a state in which the cogeneration apparatus 10 is operating normally. As shown in FIG. 4, air is sucked from the airtight chamber 12 into the intake opening 42 as indicated by arrow A in response to operation of the engine 14. The air sucked into the intake opening 42 is directed via the intake passage 43 to the air cleaner section 44 as indicated by arrow B.

The air, having been directed to the air cleaner section 44, is cleaned or purified by the air cleaner section 44 and then directed to the mixer 46 where it is mixed with a gas fuel is directed via the gas supply passage 48 to the gas flow rate adjustment section 45 as indicated by arrow D and then to the mixer 46.

The gas fuel mixed with the air by the mixer 46 is directed into the combustion chamber 18 of the engine body 15 via the throttle valve and intake passage 43 as indicated by arrow E.

In the aforementioned manner, both the power generator 16 and the ventilation fan 81 are driven by the engine 14. In response to the driving of the ventilation fan 81, air inside the fan cover 82 is directed via the air lead-out opening 84 into the airtight chamber 12 as indicated by arrow F.

By the air inside the fan cover 82 being directed into the airtight chamber 12, pressure in the interior of the fan cover 82 becomes negative, in response to which air in the ventilation duct 34 is directed to inside the fan cover 82 via the ventilation opening 35, airtight chamber 12 and ventilating air introducing opening 83 as indicated by arrow G.

In response to the air in the ventilation duct 34 being directed to inside the fan cover 82 as noted above, air in the outdoors 39 is directed to the ventilation duct 34 as indicated by arrow H.

Namely, as the ventilation fan 81 is driven, air in the outdoors 39 is directed to inside the fan cover 82 via the external duct 37, ventilation duct 34, airtight chamber 12, etc. as indicated by arrow G.

The power generator 16 is cooled with the air directed to inside the fan cover 82. The air having thus cooled the power generator 16 is directed into the airtight chamber 12 via the air lead-out opening 84 as indicated by arrow F and circulates through the airtight chamber 12 as indicated by arrow I to thereby cool the engine body 15 and heat exchanger 17.

The air having cooled the engine body 15 and heat exchanger 17 is directed via the intake opening 42 to the intake passage 43, from which it is directed to the air cleaner section 44 as indicated by arrow B. The air having been purified by the air cleaner section 44 is directed into the combustion chamber 18 of the engine body 15 via the intake passage 43.

Figure 5:
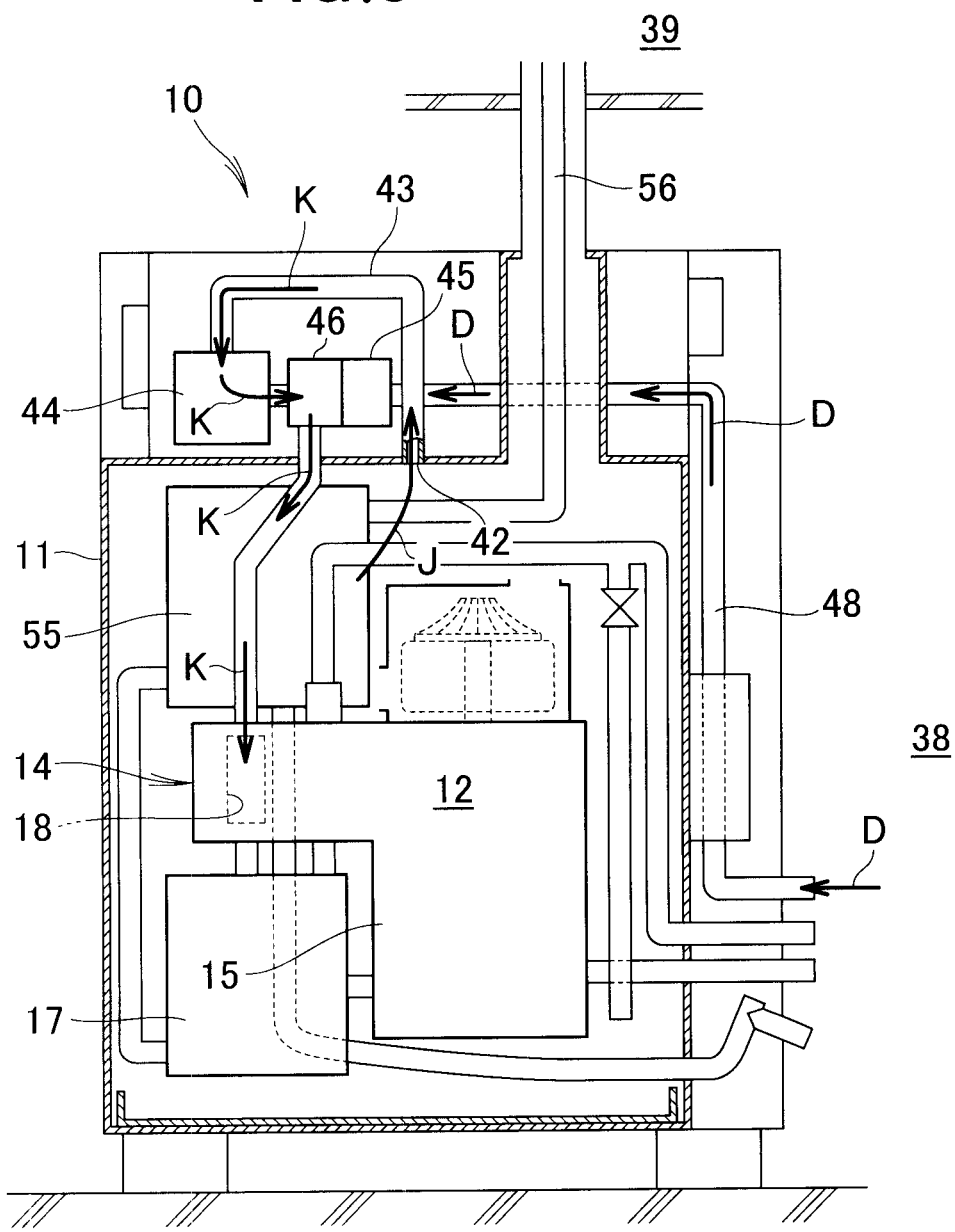
FIG. 5 is a sectional view illustrating an example detailed manner in which exhaust gas flows out to an airtight chamber in the cogeneration apparatus.

The following describe, with reference to FIG. 5, an example detailed manner in which the engine 14 is deactivated when exhaust gas has flown out to the airtight chamber 12 of the cogeneration apparatus 10.

As shown in FIG. 5, if exhaust gas flows out to the airtight chamber 12, the exhaust gas is caused to stay in the airtight chamber 12, so that the exhaust gas can be prevented from being discharged from the interior of the cogeneration casing 11 to the indoors 38. In this state, the exhaust gas, having flown out to the airtight chamber 12, is mixed with air present in the airtight chamber 12, and the exhaust gas thus mixed with the air is directed via the intake opening 42 to the intake passage 43 as indicated by arrow J.

The air directed to the intake passage 43 in the aforementioned manner is then directed into the combustion chamber 18 of the engine body 15 via the air cleaner section 44, mixer 46, etc. as indicated by arrow K.

Because the exhaust gas having flown out to the airtight chamber 12 is compulsorily directed to the combustion chamber 18 in the aforementioned manner, the engine 14 can be promptly deactivated in response to the directed exhaust gas.

In some case, the exhaust gas having flown out to the airtight chamber 12 might be of only a minute amount. In such a case, the exhaust gas is discharged from the airtight chamber 12 to the outdoors 39 via the combustion chamber 18, heat exchanger 17, muffler 55, third exhaust passage 56, etc., and thus, it can be prevented from being undesirably discharged from the interior of the cogeneration casing 11 to the indoors 38.

Figure 6:
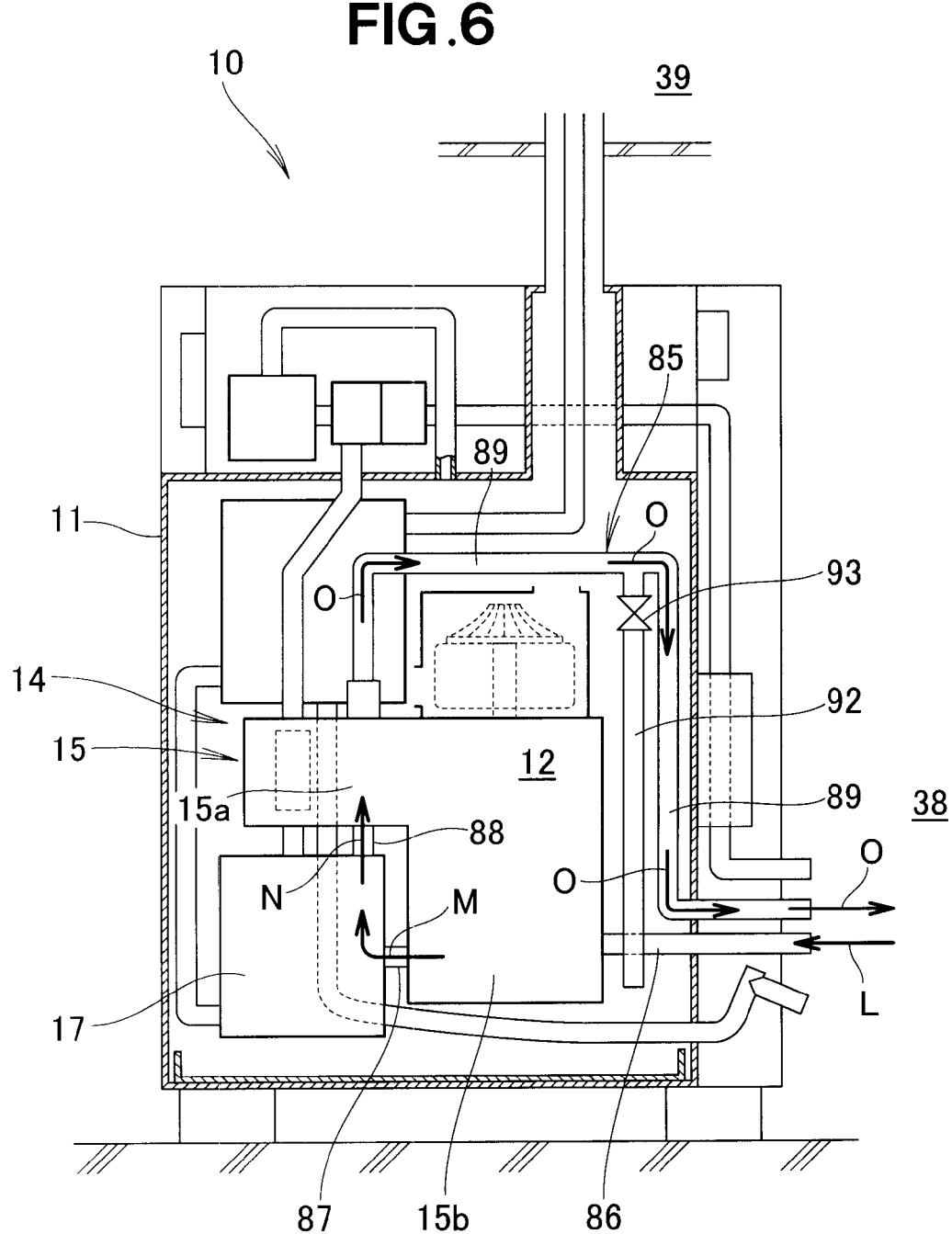
FIG. 6 is a sectional view illustrating an example detailed manner in which hot water is generated in the cogeneration apparatus.
Figure 7:
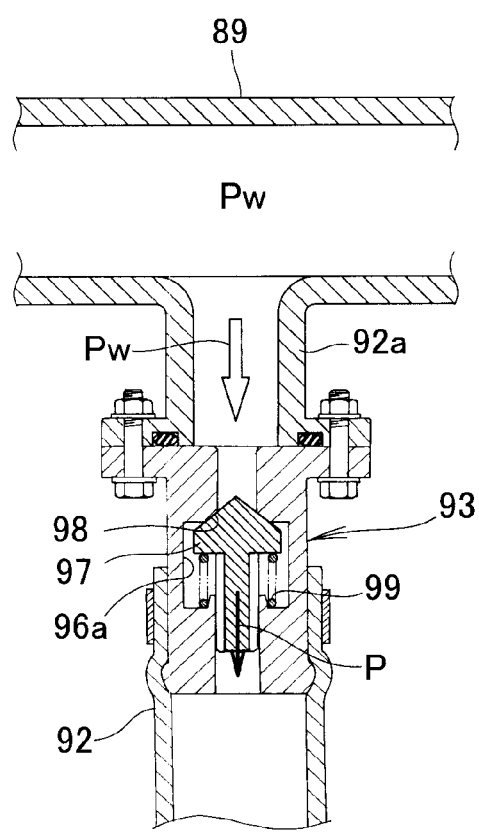
FIG. 7 is a sectional view illustrating an example detailed manner in which a relief valve is opened in the cogeneration apparatus.
Figure 8:
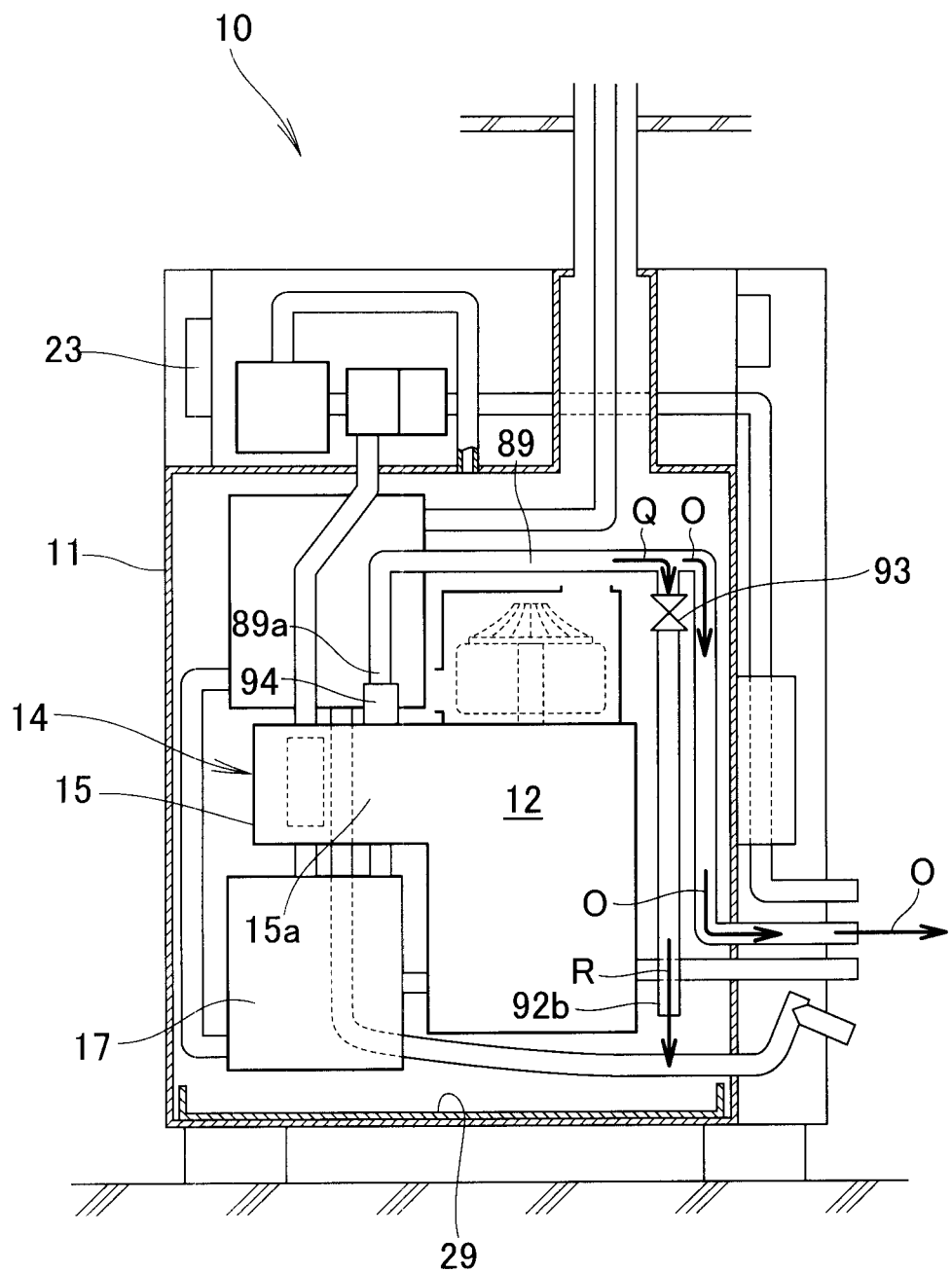
FIG. 8 is a sectional view illustrating an example detailed manner in which hot water is caused to flow out via a release passage to deactivate an engine.

The following describe, with reference to FIGS. 6 to 8, an example detailed manner in which the engine 14 is deactivated in response to the relief valve 93 of the cogeneration apparatus 10 being opened to cause hot water to flow out via the release passage 92. As shown in FIG. 6, water (warm or low-temperature hot water) of the water flow path 85 is caused to circulate by driving of the pump provided in the indoors (in the room) where the heat of hot water is used for heating.

By the circulation, the water is directed via the first water passageway 86 to the oil tank 15b as indicated by arrow L, and the water thus directed to the oil tank 15b is heat-exchanged with the heat of lubricating oil in the oil tank 15b.

Then, the water heated by the heat of the lubricating oil is directed to the heat exchanger 17 via the second water passage 87, as indicated by arrow M, where it is heat-exchanged with the heat of the exhaust gas (i.e., exhaust or waste heat of the engine 14) directed to the heat exchanger 17. Namely, hot water is generated using the waste heat of the engine 14 as a heat source.

The thus-generated hot water is directed via the third water passage 88 to the cylinder block 15a as indicated by arrow N, from which it is directed to the indoors, as indicated by arrow O, where it is used for heating the interior of the room and the like.

It is conceivable that the hot water directed to the cylinder block 15a may get to contain exhaust gas while flowing in the cylinder block 15a and, consequently, the inner pressure Pw of the fourth water passage 89 may increase to exceed the threshold value Pw1.

Once the inner pressure Pw of the fourth water passage 89 exceeds the threshold value Pw1, the compression spring 99 is compressed so that the valve member 97 moves away from the body seat portion 98 as indicated by arrow P in FIG. 7, in response to which the passage 96a of the body 96 communicates with the release passage 92 and thus the relief valve 93 is brought to the opened state.

By the relief valve 93 being opened in the aforementioned manner, the hot water and exhaust gas of the fourth water passage 89 is directed to the release passage 92, as indicated by arrow Q in FIG. 8. Then, the hot water having been directed to the release passage 92 is caused to flow out to the airtight chamber 12 via the relief valve 93 and lower end portion 92b release passage 92 as indicated by arrow R. The hot water having flown out to the airtight chamber 12 via the release passage 92 is stored on the under frame 29 so that it can be prevented from flowing out from the airtight chamber 12.

Similarly to the hot water, the exhaust gas, having been directed to the release passage 92, is discharged to the airtight chamber 12 via the relief valve 93 and lower end portion 92b of the release passage 92 as indicated by arrow R in FIG. 8. The exhaust gas discharged to the airtight chamber 12 can be prevented from flowing out from the airtight chamber 12.

As the hot water of the fourth water passage 89 is caused to flow out via the relief passage 92, the amount of hot water flowing in the heat exchanger 17 and cylinder block 15a decreases. Thus, the hot water flowing in the heat exchanger 17 and cylinder block 15a increases in temperature, so that the detected temperature Tw exceeds the threshold value Tw1.

Namely, the temperature sensor 94 detects the temperature Tw of the hot water flowing through the upstream end portion 89a of the fourth water passage 89 and outputs temperature information, indicative of the detected temperature Tw, to the second control section 23, as set forth above.

At the upstream end portion 89a of the fourth water passage 89 is flowing the hot water having just flown out of the cylinder block 15a of the engine body 15. Thus, the hot water has the highest temperature at the outlet portion of the cylinder block 15a (i.e., upstream end portion 89a of the fourth water passage 89). As a result, a temperature increase of the hot water can be detected or identified promptly by the temperature sensor 94 detecting the temperature Tw of the hot water flowing through the upstream end portion 89a.

The second control section 23 determines, on the basis of the temperature information output from the temperature sensor 94, whether the temperature indicated by the temperature information has exceeded the threshold value Tw1. If the second control section 23 has determined that the temperature indicated by the temperature information has exceeded the threshold value Tw1, it outputs to the actuator (not shown) a deactivation signal for deactivating the engine 14, in response to which the not-shown actuator, for example, stops supply of a gas fuel to the engine 14 so that the engine 14 can be promptly deactivated.

Namely, once the inner pressure Pw of the fourth water passage 89 exceeds the threshold value Pw1 due to the exhaust gas getting to be contained into the hot water, the relief valve 93 is opened so that the hot water and exhaust gas can be discharged, or can be caused to flow out, via the release passage 92. Also, once the temperature Tw of the hot water exceeds the threshold value Tw1 due to flowing out of the hot water, the engine 14 can be deactivated promptly.

The exhaust gas, having flown out (or having been discharged) to the airtight chamber 12, is caused to stay in the airtight chamber 12, so that the discharged exhaust gas can be prevented from being undesirably discharged from the interior of the cogeneration casing 11 to the indoors 38.

In addition, because the engine 14 can be deactivated promptly as noted above, the exhaust gas contained in the hot water can be prevented from flowing out, via the fourth water passage 89, to the indoors 38 (more specifically, to the room where the heat of the hot water is used for heating) outside the cogeneration casing 11 together with the hot water.

Next, with reference to FIGS. 9 to 11, a description will be given about a cogeneration apparatus 110 according to a second embodiment of the present invention, where similar elements to those in the first embodiment are indicated by the same reference numerals and characters as used for the first embodiment and will not be described here to avoid unnecessary duplication.

Second Embodiment

Figure 9:
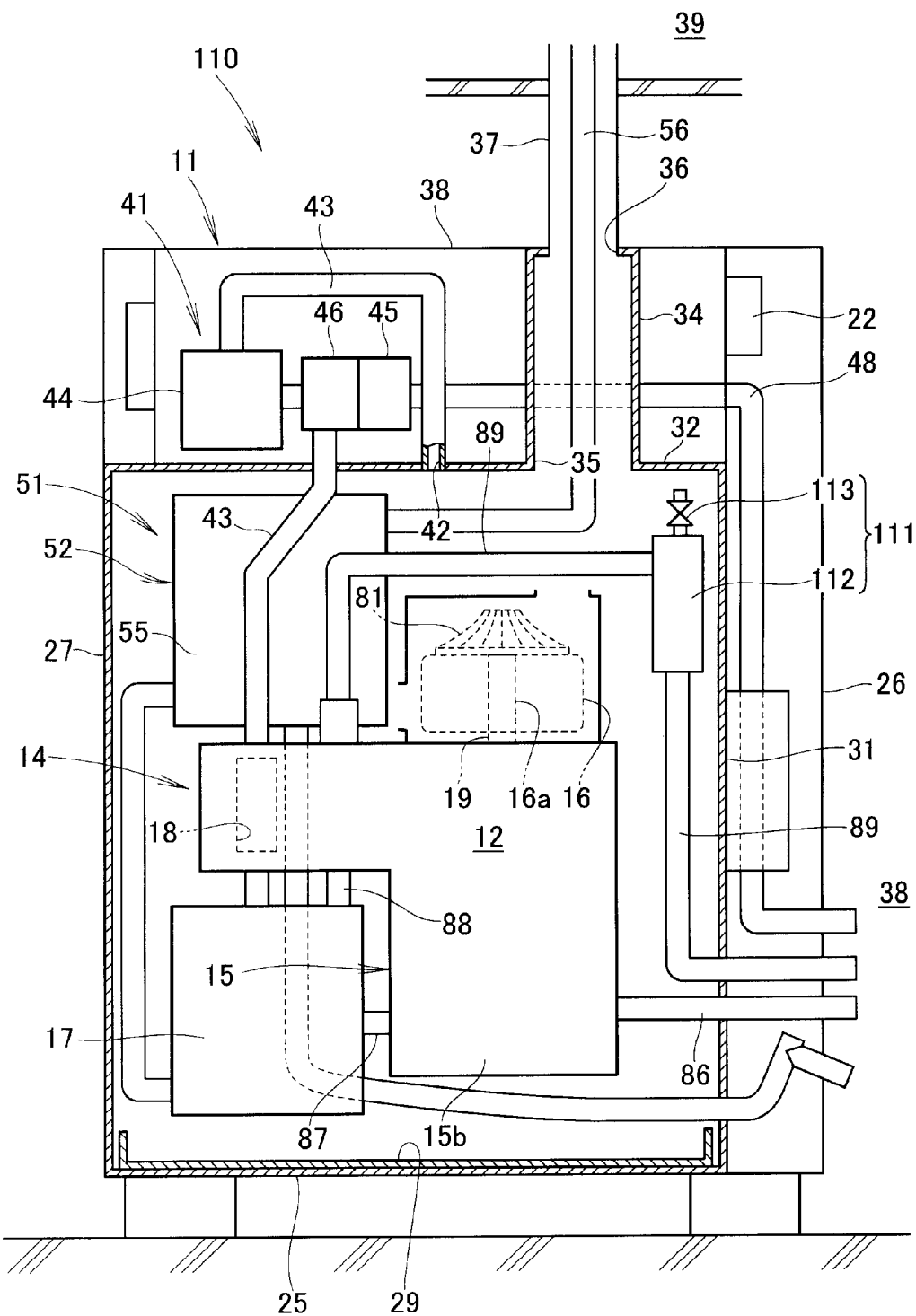
FIG. 9 is a schematic sectional front view showing a cogeneration apparatus according to a second embodiment of the present invention.

As shown in FIG. 9, the cogeneration apparatus 110 according to the second embodiment of the present invention is different from the cogeneration apparatus 10 according to the first embodiment in that it includes an exhaust gas removal section 111 in place of the exhaust gas removal section 91 provided in the first embodiment.

The exhaust gas removal section 111 includes an exhaust gas separation section 112 provided halfway in the fourth water passage 89, and a relief valve 113 provided on the exhaust gas separation section 112.

Figure 10:
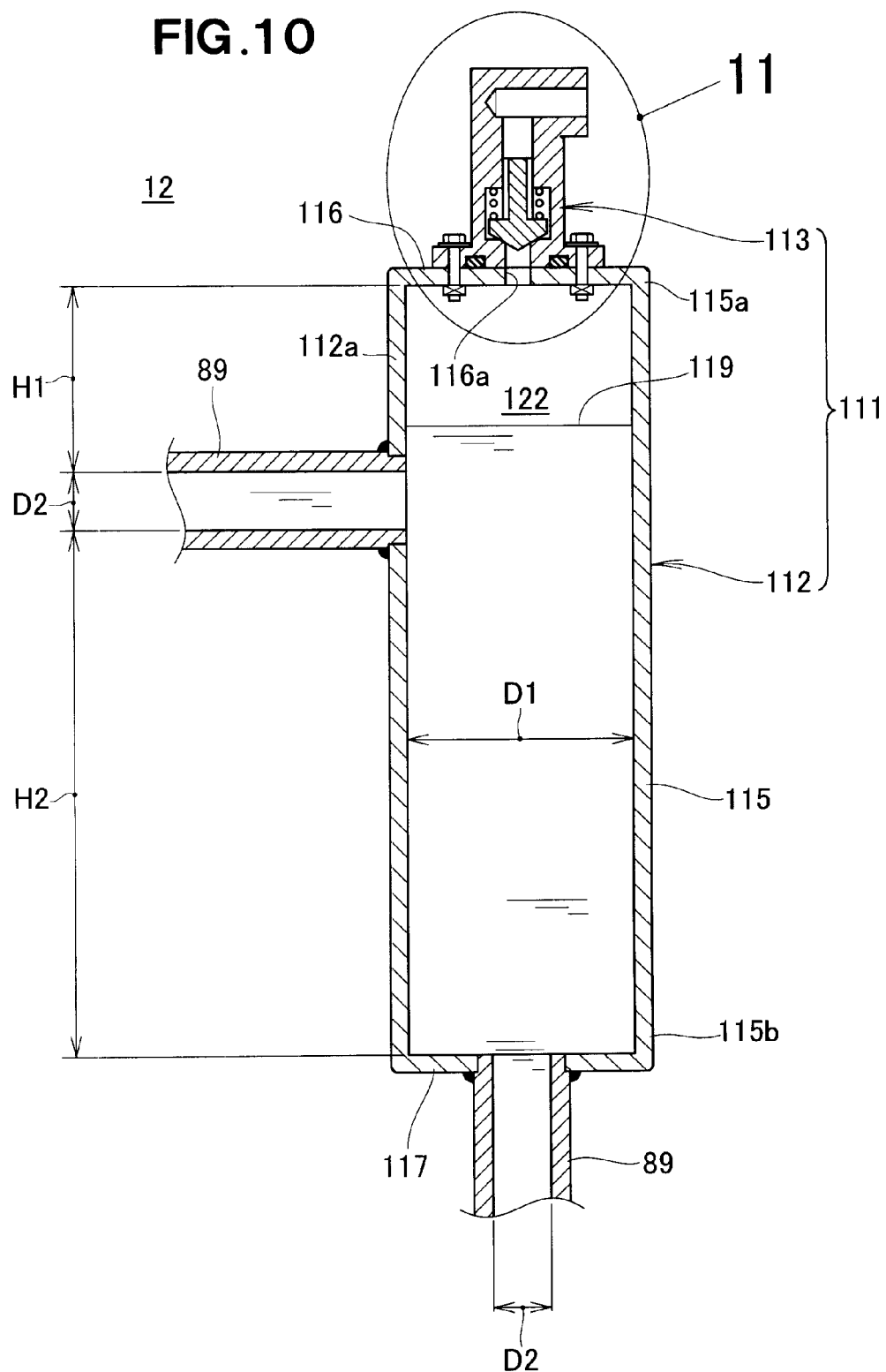
FIG. 10 is a sectional view showing an exhaust gas removal section provided in the cogeneration apparatus according to the second embodiment.

As shown in FIG. 10, the exhaust gas separation section 112 is a cylindrical member having a flow passage diameter D1 and provided substantially vertically halfway in the fourth water passage 89 within the airtight chamber 12. The exhaust gas separation section 112 includes a peripheral wall portion 115 defining a cylindrical flow passage, a top portion 116 closing the upper end 115a of the peripheral wall portion 115, and a bottom portion 117 closing the lower end 115b of the peripheral wall portion 115.

The fourth water passage 89 has an upstream portion communicating with a portion of the peripheral wall portion 115 located near the upper end 115a, and thus, the upstream portion of the fourth water passage 89 is located higher by a height H2 than the bottom portion 117.

The flow passage diameter D1 of the exhaust gas separation section 112 is greater than a flow passage diameter D2 of the fourth water passage 89. Thus, when hot water 119 is directed from an upstream portion of the fourth water passage 89 to the exhaust gas separation section 112, a gas storage space 122 can be formed by an upper end portion 112a of the exhaust gas separation section 112. As a result, exhaust gas contained in the upstream portion of the fourth water passage 89 can be directed into the gas storage space 122 while being separated from the hot water.

The relief valve 113 is provided on the top portion 116 of the exhaust gas separation section 112 and accommodated in the airtight chamber 12 (see also FIG. 9). The relief valve 113 is in communication with the gas storage space 122 of the exhaust gas separation section 112 via a communication hole 116a.

Figure 11:
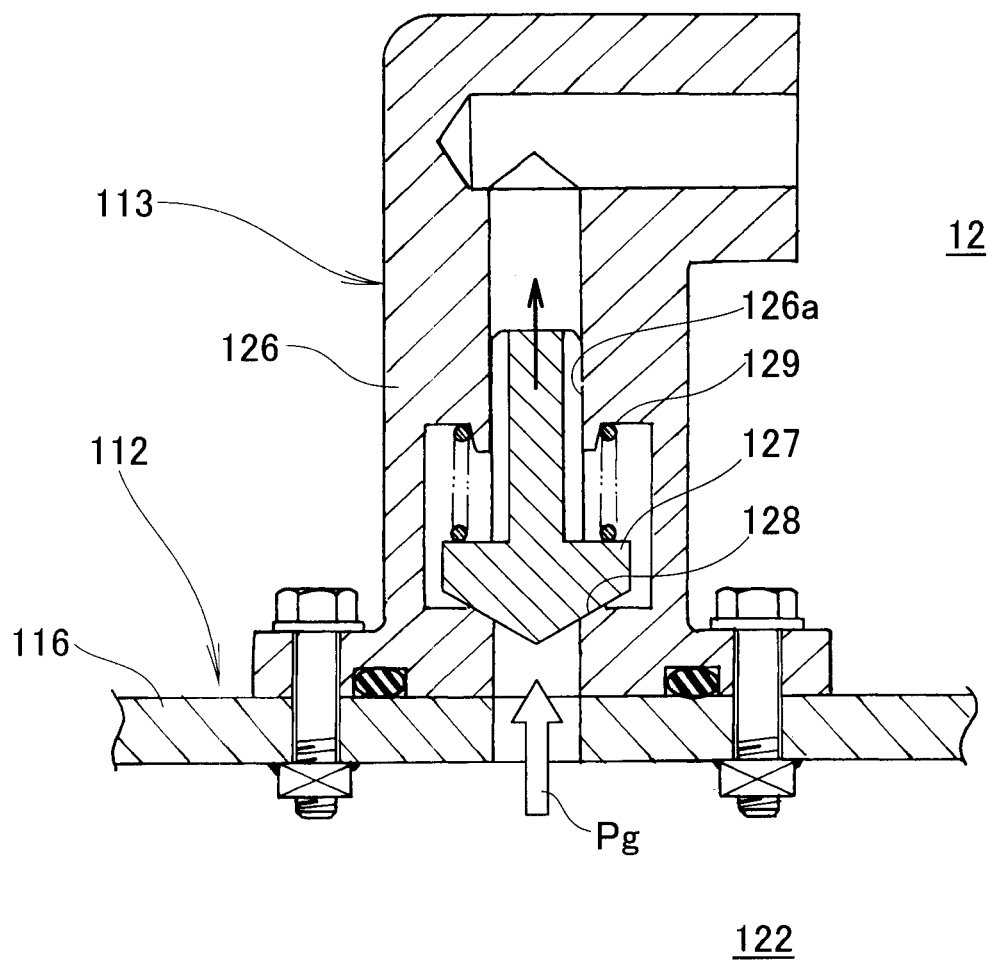
FIG. 11 is a sectional view showing in enlarged scale a section encircled at 11 in FIG. 10.

As shown in FIG. 11, the relief valve 113 includes a body (valve box) 126 capable of communicating with the gas storage space 122 of the exhaust gas separation section 112, a valve member 97 slidably provided in a passage 126a of the body 126, and a compression spring 129 for normally biasing the valve member 127 against a body seat portion 128.

The relief valve 113 is constructed in such a manner that the valve member 127 is kept abutted against the body seat portion 128 while inner pressure Pg of the gas storage space 122 is of a threshold value Pg1 or below. With the valve member 127 kept abutted against the body seat portion 128, the passage 126a of the body 126 is closed, so that the relief valve 133 is maintained in a closed state.

On the other hand, once the inner pressure Pg of the gas storage space 122 exceeds the threshold value Pg1, the compression spring 129 is compressed so that the valve member 127 moves away from the body seat portion 128 as indicated by a black upward arrow, in response to which the passage 126a of the body 126 is brought into communication with the release passage 126a and thus the relief valve 113 is brought to an opened state. Thus, exhaust gas, having been directed into the gas storage space 122, can be discharged to the airtight chamber 12 via the relief valve 133.

Figure 12:
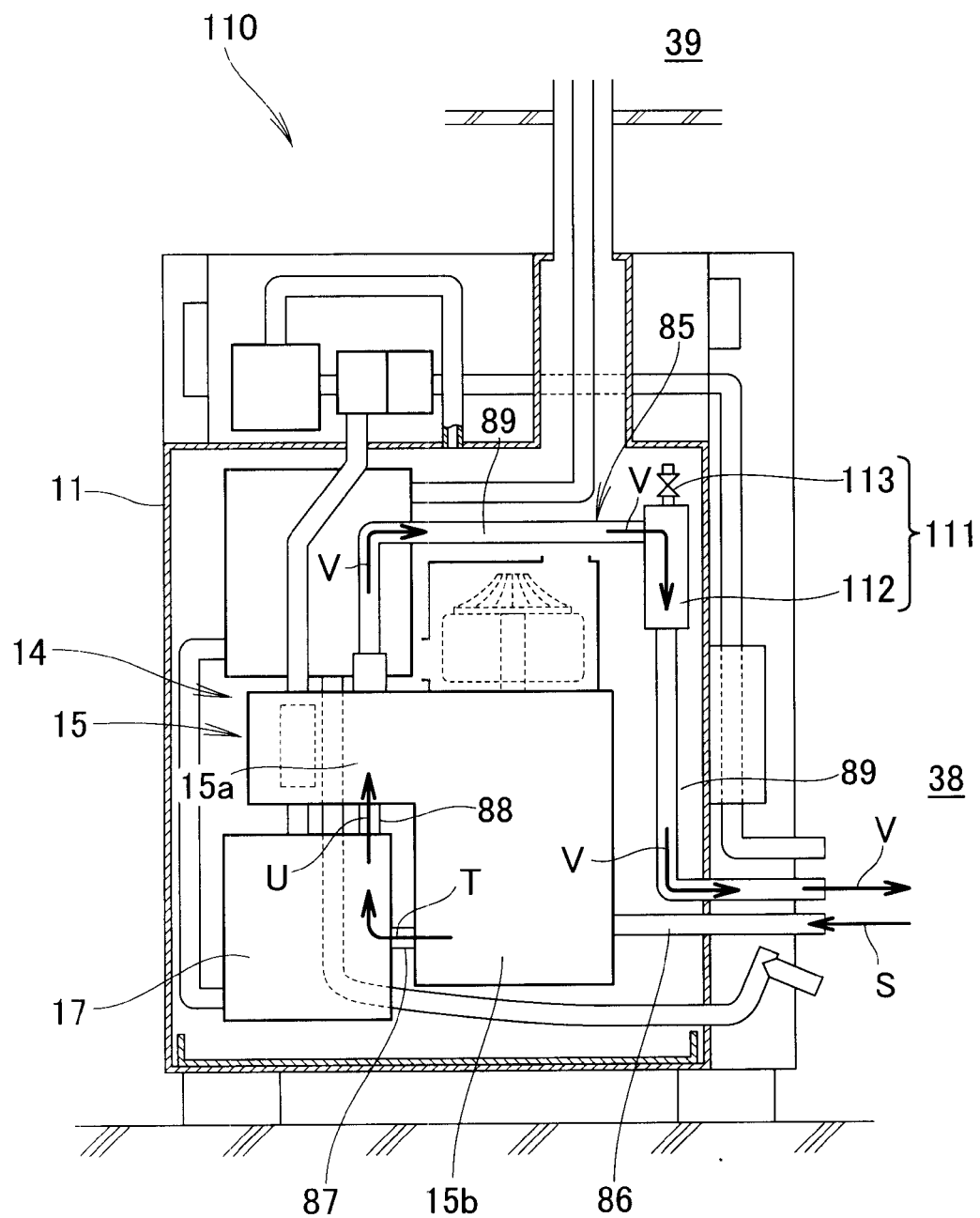
FIG. 12 is a sectional view illustrating an example detailed manner in which hot water is generated in the cogeneration apparatus according to the second embodiment.
Figure 13:
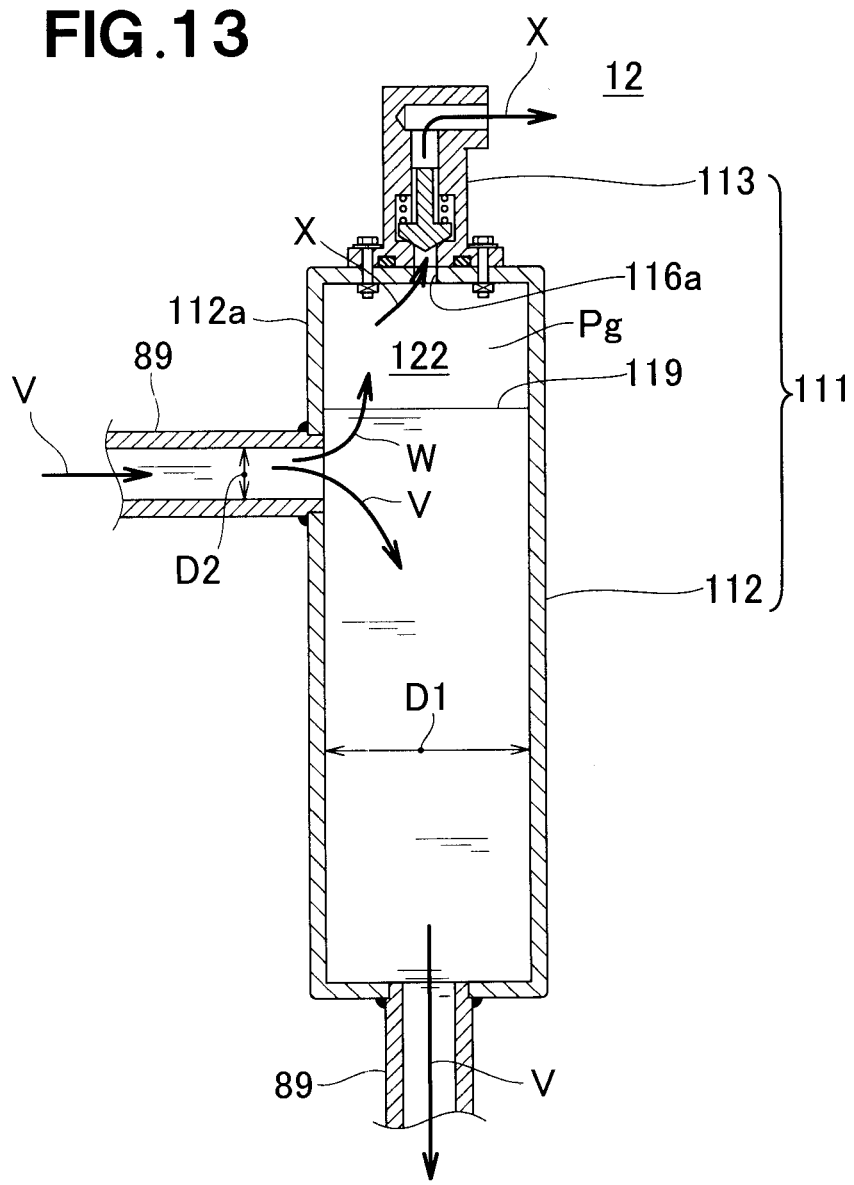
FIG. 13 is a sectional view illustrating an example detailed manner in which a relief valve is opened to discharge exhaust gas to the airtight chamber in the cogeneration apparatus according to the second embodiment.
Figure 14:
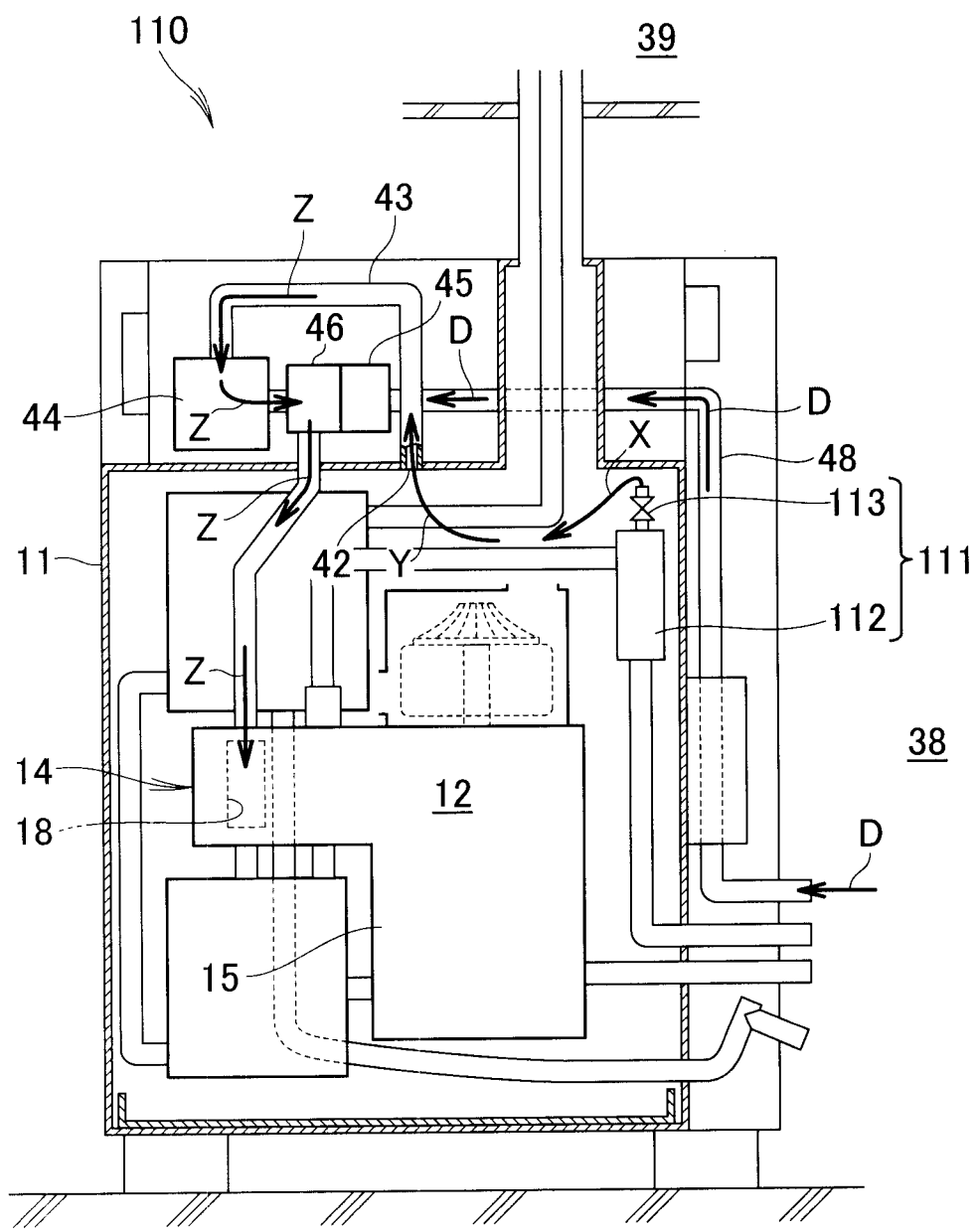
FIG. 14 is a sectional view illustrating an example detailed manner in which exhaust gas is discharged to the airtight chamber to deactivate the engine in the cogeneration apparatus according to the second embodiment.

The following describe, with reference to FIGS. 12 to 14, an example detailed manner in which the engine 14 is deactivated by the relief valve 113 of the cogeneration apparatus 110 being opened to discharge exhaust gas to the airtight chamber 12 to thereby deactivate the engine 14. As shown in FIG. 12, water (warm or low-temperature hot water) of the water flow path 85 is caused to circulate by driving of the pump provided in the indoors (in the room) where the heat of hot water is used for heating.

By the circulation, the water (warm or low-temperature hot water) is directed via the first water passageway 86 to the oil tank 15b as indicated by arrow S, and the water thus directed to the oil tank 15b is heat-exchanged with the heat of lubricating oil in the oil tank 15b.

Then, the water warmed by the heat of the lubricating oil is directed to the heat exchanger 17 via the second water passage 87, as indicated by arrow T, where it is heat-exchanged with the heat of the exhaust gas (i.e., exhaust or waste heat of the engine 14) directed to the heat exchanger 17. Namely, hot water is generated using the waste heat of the engine 14 as a heat source.

The thus-generated hot water is directed via the third water passage 88 to the cylinder block 15a as indicated by arrow U, from which it is directed, via the fourth water passage 89 and exhaust gas separation section 112, to the indoors, as indicated by arrow V, where it is used for heating the interior of the room and the like.

It is conceivable that the hot water 119 directed via the third water passage 88 to the cylinder block 15a may get to contain exhaust gas while flowing in the cylinder block 15a so that exhaust gas is present in the upstream portion of the fourth water passage 89. In this state, the hot water 119 is directed from the upstream portion of the fourth water passage 89 to the exhaust gas separation section 112 as indicated by arrow V in FIG. 13.

The flow passage diameter D1 of the exhaust gas separation section 112 is greater than the flow passage diameter D2 of the fourth water passage 89, and thus, when the hot water 119 is directed from the upstream portion of the fourth water passage 89 to the exhaust gas separation section 112 as indicated by arrow V, the gas storage space 122 is formed by the upper end portion 112a of the exhaust gas separation section 112. As a result, the exhaust gas contained in the upstream portion of the fourth water passage 89 can be directed into the gas storage space 122 while being separated from the hot water as indicated by arrow W.

Due to the exhaust gas being directed into the gas storage space 122, the inner pressure Pg of the gas storage space 122 exceeds the threshold value Pg1, so that the relief valve 113 is brought to the opened state. Thus, only the exhaust gas, having been directed into the gas storage space 122, can be discharged to the airtight chamber 12 via the relief valve 133 as indicated by arrow X. The exhaust gas discharged to the airtight chamber 12 can be prevented from undesirably flowing out from the airtight chamber 12.

The exhaust gas, having flown out to the airtight chamber 12, is mixed with air present in the airtight chamber 12, and the exhaust gas thus mixed with the air is directed via the intake opening 42 to the intake passage 43 as indicated by arrow Y in FIG. 14. The air directed to the intake passage 43 in the aforementioned manner is then directed into the combustion chamber 18 of the engine body 15 via the air cleaner section 44, mixer 46, etc. as indicated by arrow Z.

Because the exhaust gas having flown out (having been discharged) to the airtight chamber 12 is compulsorily directed to the combustion chamber 18 in the aforementioned manner, the engine 14 can be promptly deactivated in response to the directed exhaust gas.

The exhaust gas discharged to the airtight chamber 12 is caused to stay in the airtight chamber 12 as noted above, so that the discharged exhaust gas can be prevented from being undesirably discharged from the interior of the cogeneration casing 11 to the indoors 38.

In addition, because the engine 14 can be deactivated promptly, the exhaust gas contained in the hot water can be prevented from flowing out, via the fourth water passage 89, to the indoors (more specifically, to the room where the heat of the hot water is used for heating) outside the cogeneration casing 11 together with the hot water.

It should be appreciated that the cogeneration apparatus of the present invention is not limited to the above-described embodiments and may be modified variously. For example, whereas the cogeneration apparatus according to the first and second embodiments of the present invention have been described above as using the gas engine 14 as the prime mover, the present invention is not so limited, and any other types of engines, such as a gasoline engine, may be used as the prime mover.

Further, whereas the cogeneration apparatus according to the first and second embodiments of the present invention have been described as installed indoors, the cogeneration apparatus of the present invention may be installed outdoors.

Furthermore, the cogeneration apparatus according to the second embodiment of the present invention has been described above in relation to the case where the exhaust gas separation section 112 is provided substantially vertically, the exhaust gas separation section 112 may be provided obliquely or substantially horizontally with the relief valve 113 provided on the top of the exhaust gas separation section 112.

Furthermore, the shapes and constructions of the cogeneration apparatus 10, 110, cogeneration casing 11, airtight 12, engine 14, heat exchanger 17, combustion chamber 18, intake flow passage 43, water flow path 85, relief valve 93, 113, temperature sensor 94, exhaust gas separation section 112, etc. are not limited to those shown and described in relation to the first and second embodiments and may be modified as appropriate.

The basic principles of the present invention are well suited for application to cogeneration apparatus in which water introduced into an apparatus casing is changed into hot water by use of waste heat of a prime mover and the thus-generated hot water is directed out of the apparatus casing.

What is claimed is:

1. A cogeneration apparatus for generating hot water from water by use of waste heat of a prime mover, the apparatus comprising:
    an apparatus casing;
    an airtight chamber provided within the apparatus casing and constructed to prevent exhaust gas of the prime mover from flowing out from the airtight chamber;
    a heat exchanger disposed within the airtight chamber, the heat exchanger communicating with the prime mover for allowing the exhaust gas to flow through the heat exchanger;
    a water flow path communicating with an outside of the apparatus casing and the heat exchanger for introducing the water from the outside of the apparatus casing into the heat exchanger to generate the hot water due to heat exchange between the water and the exhaust gas in the heat exchanger, and directing the generated hot water out of the apparatus casing; and
    a relief valve provided in the water flow path within the airtight chamber and constructed to discharge the exhaust gas, contained in the hot water flowing in the water flow path, to the airtight chamber.

2. The cogeneration apparatus according to claim 1, wherein the relief valve is constructed to be opened once inner pressure of the water flow path exceeds a threshold value, and which further comprises:
- a temperature sensor provided in the water flow path for detecting a temperature of hot water flowing in the water flow path; and
- a control section configured to, on the basis of information indicative of the temperature detected via the temperature sensor, identify a temperature increase of the hot water occurring as a result of opening of the relief valve, to thereby deactivate the prime mover in response to the identified temperature increase.

3. The cogeneration apparatus according to claim 1, wherein the airtight chamber is constructed to be capable of communicating with a combustion chamber of the prime mover via an intake passage, and
- which further comprises an exhaust gas separation section provided in the water flow path within the airtight chamber for separating the exhaust gas, contained in the water flow path, from the hot water, the exhaust gas separated from the hot water by the exhaust gas separation section being discharged via the relief valve to the airtight chamber.

4. The cogeneration apparatus according to claim 1, wherein the water flow path includes a release passage disposed in a downward orientation within the airtight chamber, and the relief valve is disposed in the release passage for discharging the hot water and the exhaust gas contained in the hot water through the release passage into the airtight chamber when the relief valve is opened.

5. The cogeneration apparatus according to claim 1, wherein the water flow path has an upstream end portion communicating with the prime mover, the apparatus further comprising a temperature sensor disposed in the upstream end portion for detecting increase in temperature of the hot water flowing through the upstream end portion when the relief valve is opened to discharge the exhaust gas contained in the hot water into the airtight chamber, and a control section for deactivating the prime mover in response to the detection of increase in temperature of the hot water.

* * * * *